for repeated administration to patients having the herein described physiological characteristics which consists of extracting said substance from the gland with a solvent, concentrating it with a reagent which will unite with it as by adsorption, and separating said substance and reagent.

3. A method for obtaining a potent substance from the ductless portion of pancreatic or related glands in concentrated form and sufficiently free from impurities for repeated administration to patients having the herein-described physiological characteristics which consists of extracting said substance from the gland with a solvent, concentrating it with a reagent which will unite with it as by adsorption, and making a sterile aqueous solution of the substance.

4. A method for obtaining a potent substance from the ductless portion of pancreatic or related glands in concentrated form and sufficiently free from impurities for repeated administration to patients having the herein-described physiological characteristics which consists of extracting said substance from the gland with a solvent, concentrating it with a reagent which will unite with it as by adsorption, separating the substance and the reagent, and making a sterile aqueous solution of the substance.

5. A method for obtaining a potent substance from the ductless portion of pancreatic or related glands in concentrated form and sufficiently free from impurities for repeated administration to patients having the herein-described physiological characteristics which consists of extracting said substance from the gland with a solvent, filtering the extractive, separating said substance from the filtrate with a reagent which acts as by adsorption, and separating the substance and reagent.

6. A method for obtaining a potent substance from the ductless portion of pancreatic or related glands in concentrated form and sufficiently free from impurities for repeated administration having the herein described physiological characteristics which consists of extracting said substance from the gland with a solvent, filtering the extractive, separating said substance from the filtrate with a reagent which acts as by adsorption, separating the substance and reagent, and making an aqueous sterile solution of said substance.

7. A method for obtaining a potent substance from the ductless portion of pancreatic or related glands in concentrated form and sufficiently free from impurities for repeated administration having the hereindescribed physiological characteristics which consists of extracting said substance from the gland with a solvent, concentrating said substance with benzoic acid, and separating the substance from the benzoic acid.

8. A method for obtaining a potent substance from the ductless portion of pancreatic or related glands in concentrated form and sufficiently free from impurities for repeated adminisrtation having the hereindescribed physiological characteristics which consists of extracting said substance from the gland with a solvent, concentrating said substance with benzoic acid, separating the substance from the benzoic acid, and making an aqueous sterile solution of said substance.

9. A method for obtaining a potent substance from the ductless portion of pancreatic or related glands in concentrated form and sufficiently free from impurities for repeated administration to patients having the hereindescribed physiological characteristics which consists of extracting said substance from the gland with an acid solvent and concentrating it with a reagent which will unite with it as by adsorption.

10. A method for obtaining a potent substance from the ductless portion of pancreatic or related glands in concentrated form and sufficiently free from impurities for repeated administration to patients having the hereindescribed physiological characteristics which consists of extracting said substance from the gland with a solvent, separating the substance from the solution with a reagent as a solid, dissolving said solid, and concentrating said substance with a reagent which will unite with it as by adsorption.

11. A method for obtaining a potent substance from the ductless portion of pancreatic or related glands in concentrated form and sufficiently free from impurities for repeated administration to patients having the hereindescribed physiological characteristics which consists of extracting said substance from the gland with a solvent, separating the substance from the solution with ammonium sulphate, dissolving the ammonium sulphate from said substance, and concentrating said substance with a reagent which will unite with it as by adsorption.

12. A method for obtaining a potent substance from the ductless portion of pancreatic or related glands in concentrated form and sufficiently free from impurities for repeated administration to patients having the hereindescribed physiological characteristics which consists of extracting said substance from the gland with a solvent, separating the substance from the solution with ammonium sulphate, dissolving the ammonium sulphate from said substance and concentrating said substance with benzoic acid.

13. A method for obtaining a potent substance from the ductless portion of pancreatic or related glands in concentrated form and sufficiently free from impurities for repeated administration to patients having the hereindescribed physiological characteristics which consists of extracting said substance from the gland with a solvent, separating the substance from the solution with ammonium sulphate, dissolving the ammonium sulphate from said substance, concentrating said substance with benzoic acid, and separating said substance from the benzoic acid.

14. A method for obtaining a potent substance from the ductless portion of pancreatic or related glands in concentrated form and sufficiently free from impurities for repeated adminstration to patients having the hereindescribed physiological characteristics which consists of extracting said substance from the gland with a solvent, separating the substance from the solution with ammonium sulphate, dissolving the ammonium sulphate from said substance, concentrating said substance with benzoic acid, separating said substance from the benzoic acid, and making an aqueous sterile solution of said substance.

Dated at the said city of Toronto, this tenth day of January, A. D. 1923.

PETER JOSEPH MOLONEY.
DONALD M. FINDLAY.

Witnesses:
ROBERT McCLINTOCK,
STANLEY RICHARDS.

Patented Oct. 9, 1923.

1,470,024

UNITED STATES PATENT OFFICE.

PETER JOSEPH MOLONEY AND DONALD M. FINDLAY, OF TORONTO, ONTARIO, CANADA, ASSIGNORS TO THE GOVERNORS OF THE UNIVERSITY OF TORONTO, OF TORONTO, ONTARIO, CANADA.

METHOD OF PREPARING AN EXTRACT, OBTAINABLE FROM THE MAMMALIAN PANCREAS OR FROM THE RELATED GLANDS OF FISHES, USEFUL IN THE TREATMENT OF DIABETES MELLITUS.

No Drawing. Application filed January 12, 1923. Serial No. 612,157.

*To all whom it may concern:*

Be it known that we, PETER JOSEPH MOLONEY and DONALD MUNRO FINDLAY, British subjects, residing at the city of Toronto, in the county of York and Province of Ontario, Dominion of Canada, have invented a new and useful method of preparing an extract, obtainable from the mammalian pancreas or from the related glands of fishes, useful in the treatment of diabetes mellitus; and we hereby declare that the following is a full, clear, and exact description of the same.

Investigations conducted by Banting, Best, and Collip at the University of Toronto proved that it is possible to obtain a potent substance or extract, containing in concentrated form the secretion or hormone from the ductless portion of the pancreatic glands of mammalia, and cartilaginous fishes and the related glands (principal islets) of bony fishes, sufficiently free from injurious substances for repeated administration to human patients and having the physiological characteristics of removing the cardinal objective symptoms of diabetes mellitus in patients and reducing the blood sugar in laboratory animals.

The methods employed during these investigations involved the use of such reagents as ethyl alcohol, methyl alcohol, methylated spirits, and acetone, for extracting the secretion or hormone from the gland and then fractionally precipitating the potent substance free from the associated gland tissue and the injurious substances in the extractive solution.

From the results of our experience during these investigations we concluded that it is possible to extract the secretion or hormone from the gland by various reagents which tend to retard or inhibit the digestive action of the gland tissue and remove the injurious substances going into the extractive solution, and that it is also possible to concentrate and purify the potent substance in the extractive solution by the use of reagents which will unite with it as by adsorption or by the use of reagents which will precipitate it free from adherent and associated substances. As extracting reagents we found that boiling water produced satisfactory results both in regard to the maximum yield of the potent substance and the small amount of proteins and other gland substances in the extractive solution and that copper sulphate solution produced substantially the same results as the boiling water.

We also found that various organic and inorganic reagents will separate the potent substance from the other extractive substances and of these benzoic acid, formed by adding sodium benzoate and hydrochloric acid to the extractive solution will unite with the potent substance as by adsorption.

In an alternative method we found that by adding an equal volume of saturated solution of ammonium sulphate to the aqueous extractive solution, a solid separated out of the solution and floated to the top. This solid contained the potent substance and some of the other extractive substances. We removed the solid and after eliminating the adhering ammonium sulphate we dissolved the solid in distilled water and separately added to the resulting solution sodium benzoate and hydrochloric acid which formed a precipitate of benzoic acid and this precipitate united with the potent substance as by adsorption.

The following is an example of one method by which we obtained the potent substance or extract containing in concentrated form the internal secretion or hormone of the pancreas of mammalia.

The fresh pancreas was minced and mixed with an equal volume of boiling water which extracted from the gland the potent substance derived from the secretion or hormone. The temperature of the resulting aqueous extractive solution was maintained at from 85° C. to 100° C. for a period of about five minutes and then suddenly reduced to about 15° C. at which it was allowed to stand. The boiling water tended to prevent the proteins going into the extractive aqueous solution with the potent substance and also tended to destroy the enzymes, including trypsin, erepsin, and the poteases.

When cooled the lipoids were removed and the mixture was filtered. 100 c. c. of 25% sodium benzoate solution and 25 c. c. of concentrated hydrochloric acid were separately added to each litre of the aqueous extractive filtrate, and these formed a precipitate of benzoic acid in a finally divided state, which carried with it the potent substance as by adsorption. The benzoic acid precipitate with the adhering potent substance was then separated from the filtrate by further filtering or by centrifuging and when separated it was washed with a saturated aqueous solution of benzoic acid to free it from any of the filtrate from which it had been precipitated. The washed precipitate was then dried and the resulting product was a powder containing the potent substance or extract practically free from injurious substances. Although kept for a considerable time the potency of the substance in this form did not appreciably deteriorate under proper conditions of sterility and temperature.

200 c. c. of 80% alcohol were added to the washed precipitate to dissolve the benzoic acid and potent substance and this solution was stirred or agitated and then allowed to stand so that any inert material could settle, after which it was filtered. After filtration the major portion of the alcohol was boiled off from the filtrate which was then shaken with ether and water and allowed to stand, when two layers were manifested. The lower aqueous layer contained the potent substance in concentrated and purified form and the upper layer contained the benzoic acid. The lower aqueous layer was separated from the mixture and washed with ether to remove any remaining traces of alcohol and benzoic acid after which the traces of ether were boiled off. The aqueous residue was then sterilized by filtration through a Berkfeldt filter, and contained the potent substance.

We also extracted the secretion or hormone from the minced pancreas with ethyl alcohol, methyl alcohol, methylated spirits, and acetone, as in the methods of Banting, Best and Collip, and then concentrated the potent substance in the extractive filtrate by precipitating it with benzoic acid as above.

The following is an example of the alternative method by which we obtained the potent substance from the pancreas of mammalia:—

One kilogram of ground pancreas was mixed with 70 c. c. of 10% copper sulphate solution and 15 c. c. of concentrated hydrochloric acid to retard the extraction of the proteins and other injurious substances from the gland. Two litres of water, heated to 80° C., were then added to the mixture for extracting the potent substance. The resulting aqueous extractive solution was then filtered and to the filtrate was added an equal volume of saturated solution of ammonium sulphate. When the ammonium sulphate was added, a solid separated out of the solution and floated to the top. This solid contained the potent substance and some of the other extractive substances. This solid was removed from the filtrate and freed from the adhering ammonium sulphate solution. The solid was then dissolved in 100 c. c. of distilled water to which was separately added sodium benzoate and hydrochloric acid which formed a precipitate of benzoic acid. This precipitate united with the potent substance as by adsorption.

The benzoic acid precipitate with the adhering potent substance was then separated from the aqueous solution by filtering or by centrifuging and when separated was washed with a saturated aqueous solution of benzoic acid to free it from any ammonium sulphate solution still adhering to it. 95% alcohol was then added to the washed precipitate to dissolve the benzoic acid and potent substance and in sufficient quantity to make a concentration of 80% alcohol. This alcohol solution was stirred or agitated and then allowed to stand so that any inert material could settle after which it was filtered. After filtration the major portion of the alcohol was boiled off from the filtrate which was then shaken with ether and water and allowed to stand when two layers were manifested. The lower aqueous layer contained the potent substance in concentrated and purified form and the upper layer contained the benzoic acid. The lower aqueous layer was separated from the mixture and washed with ether to remove any remaining traces of alcohol and benzoic acid after which the traces of ether were boiled off. The aqueous residue was then sterilized by filtration through a Berkfeldt filter and contained the potent substance.

Having thus fully described our invention, what we claim as new and desire to secure by Letters Patent is:—

1. A method for obtaining a potent substance from the ductless portion of pancreatic or related glands in concentrated form and sufficiently free from impurities for repeated administration to patients having the herein-described physiological characteristics which consists of extracting said substance from the gland with a solvent and concentrating it with a reagent which will unite with it as by adsorption.

2. A method for obtaining a potent substance from the ductless portion of pancreatic or related glands in concentrated form and sufficiently free from impurities